United States Patent
Genest et al.

(10) Patent No.: US 8,505,944 B2
(45) Date of Patent: Aug. 13, 2013

(54) STEP DEVICE FOR A VEHICLE TAILGATE

(76) Inventors: Kerry Genest, Edmonton (CA); Randy Genest, Minburn (CA)

(*) Notice: Subject to any disclaimer, the term of this patent is extended or adjusted under 35 U.S.C. 154(b) by 137 days.

(21) Appl. No.: 13/234,402

(22) Filed: Sep. 16, 2011

(65) Prior Publication Data

US 2012/0104721 A1    May 3, 2012

Related U.S. Application Data

(60) Provisional application No. 61/409,703, filed on Nov. 3, 2010.

(51) Int. Cl.
*B60R 3/02*         (2006.01)

(52) U.S. Cl.
USPC ............................................ 280/166; 296/62

(58) Field of Classification Search
USPC ............. 280/163, 164.1, 166, 169; 182/127; 206/62
See application file for complete search history.

(56) References Cited

U.S. PATENT DOCUMENTS

| | | | |
|---|---|---|---|
| 4,191,388 A | | 3/1980 | Barksdale |
| 4,639,032 A | * | 1/1987 | Barbour .......................... 296/62 |
| 5,803,523 A | * | 9/1998 | Clark et al. .................. 296/26.1 |
| 6,102,479 A | * | 8/2000 | Wallace ........................ 297/357 |
| 6,422,342 B1 | * | 7/2002 | Armstrong et al. ........... 182/127 |
| 7,422,263 B2 | * | 9/2008 | Pritchard ........................ 296/62 |
| 7,441,820 B1 | * | 10/2008 | Alvarado ........................ 296/62 |
| D585,350 S | | 1/2009 | Coletti |
| 7,516,997 B2 | | 4/2009 | Kuznarik et al. |
| D593,472 S | * | 6/2009 | Coletti ........................ D12/203 |
| 7,673,922 B1 | | 3/2010 | Grimes |

* cited by examiner

*Primary Examiner* — Frank Vanaman
(74) *Attorney, Agent, or Firm* — Ryan W. Dupuis; Kyle R. Satterthwaite; Ade & Company Inc.

(57) ABSTRACT

A step device mounts on the tailgate of a truck to pivot downwardly and rearwardly from the open tailgate in a working position for providing easier access to the truck box. The step device includes a base fastened onto the tailgate upon which two rails are slidably mounted between retracted and extended positions. A pair of legs are pivotally coupled to rear ends of the respective rails and are joined by a step member opposite the pivoted ends. The base is fully unobstructed between the rails and the area between the legs is fully unobstructed above the step member to remove any tripping hazards in use.

18 Claims, 6 Drawing Sheets

STEP DEVICE FOR A VEHICLE TAILGATE

This claims the benefit under 35 U.S.C. 119(e) of U.S. provisional application Ser. No. 61/409,703, filed Nov. 3, 2010.

FIELD OF THE INVENTION

The present invention relates to a step device for attachment to a vehicle tailgate, for example a tailgate on a passenger truck having a truck box, in which the step device is pivotal between a stored position against an inner surface of the tailgate and a working position providing a step depending downwardly from a free end of the tailgate in an open position of the tailgate.

BACKGROUND

The tailgate in many vehicle truck boxes is too high for many users to readily climb into the box for accessing cargo and the like. Accordingly, many steps are known in the prior art for assisting users and climbing into the pickup truck bed.

U.S. Pat. No. 7,516,997 by Kuznarik et al. discloses an example of a series of steps forming a large ladder structure for access to the truck bed of large commercial trucks. The large cumbersome nature of these steps makes the steps unsuitable for smaller passenger pick up trucks.

U.S. Pat. No. 7,673,922 by Grimes and U.S. Pat. No. 4,191,388 by Barksdale disclose simple U-shaped step structures which are suspended from hinges attached to the tailgate. In order to allow the steps to depend downwardly from the end of the tailgate, the hinges must be located very close to the edge of the tailgate such that the hinges may protrude above the tailgate in the closed position or otherwise interfere with a cover for the truck box. Furthermore, the steps in each instance engage the top edge of the tailgate which may mark the finish of the tailgate causing potential for corrosion or otherwise unattractive damage to the finish of the top edge of the tailgate.

U.S. Pat. Nos. 6,422,342 by Armstrong et al. and D585,350 by Coletti disclose further examples of steps for a pickup truck tailgate. In each instance, the step is connected to a slide so that the step may be suspended from hinges spaced outwardly from the edge of the tailgate in a working position to overcome some of the disadvantages of the prior patents noted above. The slide structure in each instance however, requires a large housing including a base plate and an enclosure above the base plate to receive the sliding components. The large enclosure above the base plate in each instance presents a trip hazard for a user climbing into the step box as well as requiring large amounts of material for a relatively simple product such that the devices are unnecessarily costly.

SUMMARY OF THE INVENTION

According to one aspect of the invention there is provided a step device for a supporting surface of a vehicle arranged to span generally horizontally in a first direction from an inner end to an opposing outer end, the step device comprising:

a base arranged for attachment to the supporting surface;

a pair of rails mounted on the base parallel and spaced apart from one another so as to be arranged to extend longitudinally in the first direction between an inner end and an outer end of the rails, each rail being longitudinally slidable relative to the base between an extended position in which the outer end is arranged to project outwardly in the first direction beyond the outer end of the supporting surface and a retracted position in which the outer end does not project outwardly beyond the outer end of the supporting surface;

a leg pivotally coupled at a first end to the outer end of each rail such that the leg is pivotal relative to the respective rail through a range of more than 225 degrees between a working position arranged to extend downwardly from the first end of the leg at the outer end of the respective rail in the extended position of the respective rail to an opposing second end of the leg and a stored position arranged to extend alongside the respective rail from the first end of the leg at the outer end of the respective rail to the second end of the leg adjacent the inner end of the respective rail; and a step joined between the legs at a location spaced from the first ends of the legs such that the legs are pivotal together between the working position and the stored position thereof and such that the rails are slidable together in the stored position of the legs between the extended position and the retracted position of the rails;

wherein the base is substantially unobstructed between the rails.

The base preferably consists of a flat plate member upon which the rails are supported, the rails being connected only by the flat plate member of the base such that the rails are unobstructed therebetween above the flat plate member of the base.

Preferably a slider comprising material having a low coefficient of friction mounted between each rail and the base for sliding movement relative to one of the base or the respective rail.

Preferably the base and the rails are formed of metal and the slider comprises plastic material.

Preferably the legs are coupled to one another by the step adjacent the second ends of the legs.

Preferably each rails spans substantially a full length of the respective leg between the first end and the step adjacent the second end.

Preferably each rail comprises a generally U-shaped channel comprising a pair of parallel and spaced apart side flanges extending upwardly from a base flange joined therebetween and receiving the respective leg therebetween in the stored position.

Preferably the base flange is coupled to the base for relative sliding movement therebetween.

Each rail may include at least one longitudinally extending slot arranged to receive a respective lug protruding from the base therein such that the lug is slidable along the slot as the rail is displaced between the retracted and extended positions respectively. Preferably a pair of lugs protruding from the base at longitudinally spaced apart locations in association with each rail in which each lug is slidably received within a respective longitudinally extending slot.

Preferably each lug comprises a threaded fastener.

Preferably the rails are only coupled to the base by the lugs in the respective longitudinally extending slots.

When an elongate handle extends between a first end pivotally coupled to the base and an opposing second end such that the handle is pivotal between a stored position along the base alongside one of the rails and a working position extending perpendicularly upward from the base, preferably the handle includes a lower section which is near in length to one of the rails and an upper section which is telescopically received in the lower section.

Preferably the handle includes a locking element which is vertically slidable upwardly in the working position from a locked position in which the handle is prevented from being pivoted into the stored position to a released position in which the handle is pivotal from the working position to the stored position.

Preferably the locking element comprises a protrusion on the handle slidably received in a vertical slot on one of the hinge plates in the locked position.

Preferably at least one of the hinge plates comprises a raised edge upon which the protrusion on the handle is slidably engaged as the handle is pivoted from the working position in which the vertical slot depends downwardly from said raised edge in alignment with the protrusion on the handle when the handle is in the working position.

Preferably the handle is vertically slidable together with the locking element between the locked position and the released position.

Preferably an upper surface of the base between the rails includes a gripping material thereon.

Preferably the supporting surface of the vehicle comprises an inner surface of a tailgate of a vehicle and the inner end is hinged to the vehicle such that the tailgate is pivotal between a closed position in which the inner surface of the tailgate is substantially upright and an open position in which the inner surface spans substantially horizontally outwardly in the first direction from the inner end hinged on the vehicle to the outer end forming a free end opposite the inner end.

By providing two legs pivotally supported on respective rails slidable on the base with no obstruction between the rails, a simple low cost construction results having the advantages of retracting relative to the top edge of the tailgate in storage while also being free of any trip hazards between the rails in the working position to overcome disadvantages of the prior art.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a step device generally indicated by reference numeral 10.

The device 10 is particularly suited for use with a tailgate 12 of a vehicle, for example the tailgate of a truck box of a typical passenger pickup truck in which the box includes two side walls open at the rear end where the tailgate is located for selectively enclosing the rear end of the box between the side walls. The tailgate 12 is typically hinged at an inner end 14 to the rear edge of the truck box so as to be pivotal between a closed position in which an inner surface 16 of the tailgate is in a substantially vertical orientation for forming a rear wall of the truck box and an open position in which the gate is pivotal about a horizontal lateral axis through a range of 90 degrees such that the inner surface extends horizontally rearward in a first direction from the inner end 14 to a free outer end 18. The inner surface also spans laterally in a second direction between opposing ends of the tailgate arranged to be latched to the side walls of the truck box respectively.

The device 10 comprises a base 20 in the form of a flat rigid metal plate which is rectangular in shape. Suitable fasteners 22 are provided to secure the base flat against the inner surface 16 of the tailgate in parallel relation with the inner surface so as to be pivotal together with the tailgate between the open and closed positions thereof. An outer end 24 of the base is arranged to be positioned parallel and adjacent to the outer end of the tailgate such that the base does not protrude outwardly beyond the end of the tailgate.

The device further comprises two rails 26 which are mounted on the base to extend longitudinally in the first direction of the tailgate from respective inner ends 28 to respective outer ends 30 such that the rails are parallel and spaced apart from one another. Each rail comprises a generally U-shaped channel including a base flange 32 arranged to be fastened to the base and two side flanges 34 along opposing sides of the base flange to extend upwardly therefrom at parallel and spaced apart locations. The base flange is accordingly parallel to the inner surface of the tailgate at the base while the two side flanges 34 project perpendicularly from the inner surface and the base. The side flanges 34 include a forward portion having a consistent height from the base flange and a rear portion adjacent the rear ends which tapers so as to be reduced in height from a maximum height adjacent the forward portion to a minimum or zero height at the rear ends so as to reduce sharp corners that might cause injury.

A slider 36 formed of a plastic having a low coefficient of friction is mounted between the base flange of each rail 26 and the base 20 to reduce friction between the rails and the base as the rails are supported for sliding movement longitudinally in the first direction. Each slider is a rectangular sheet of material having a minimal thickness near to the thickness of the base flange of the rails and having dimensions which correspond to the width and to most of the length of the corresponding base flange. Each slider 36 is fixed relative to the base such that the rail is supported for sliding movement relative to the slider 36 and the base therebelow.

Figure 1:
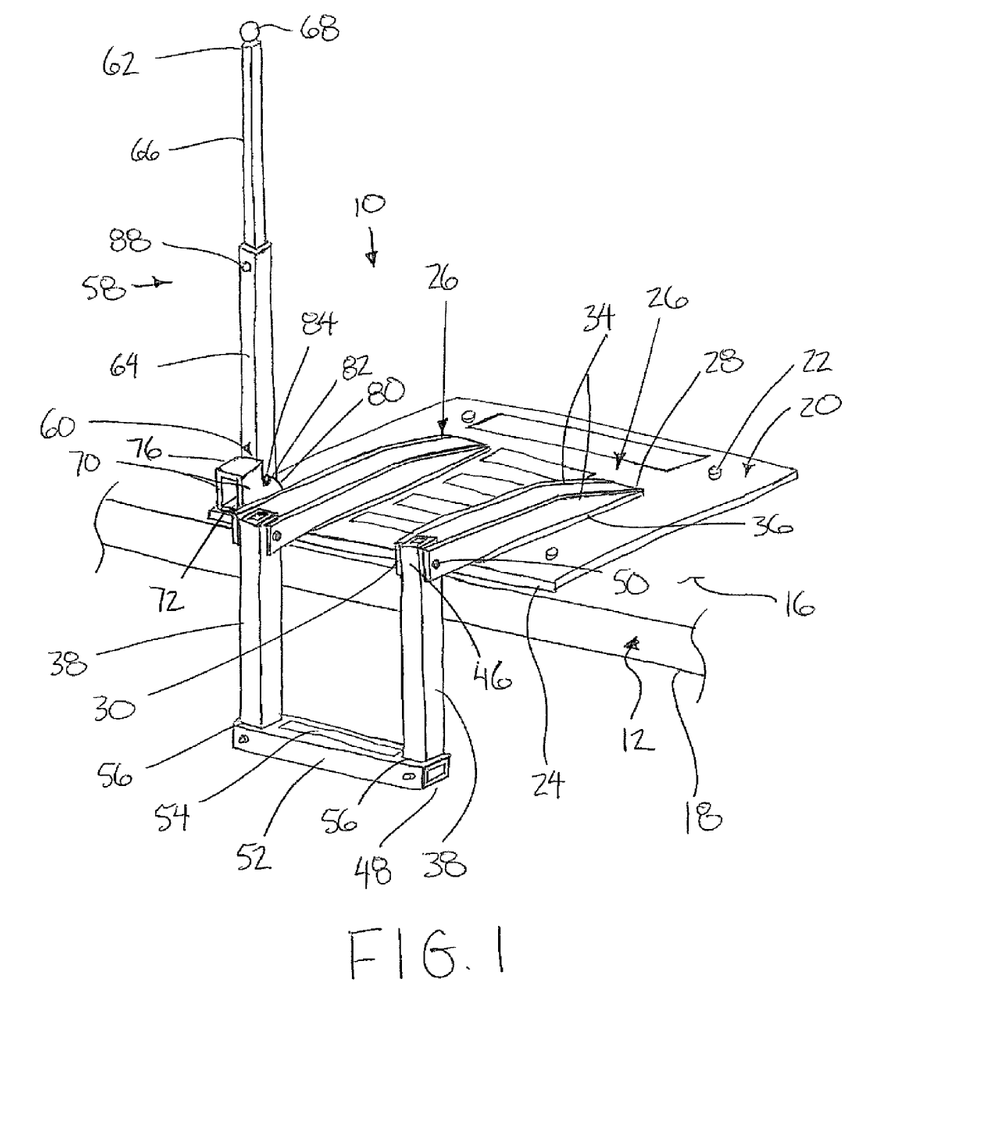
FIG. 1 is perspective view of the step device in the working position.
Figure 2:
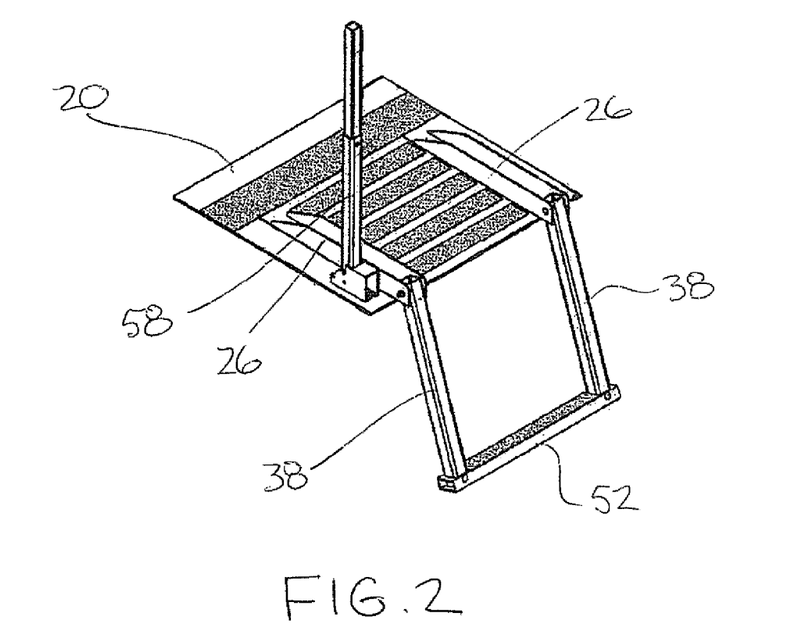
FIG. 2 is another perspective view of the step device in the working position.
Figure 3:
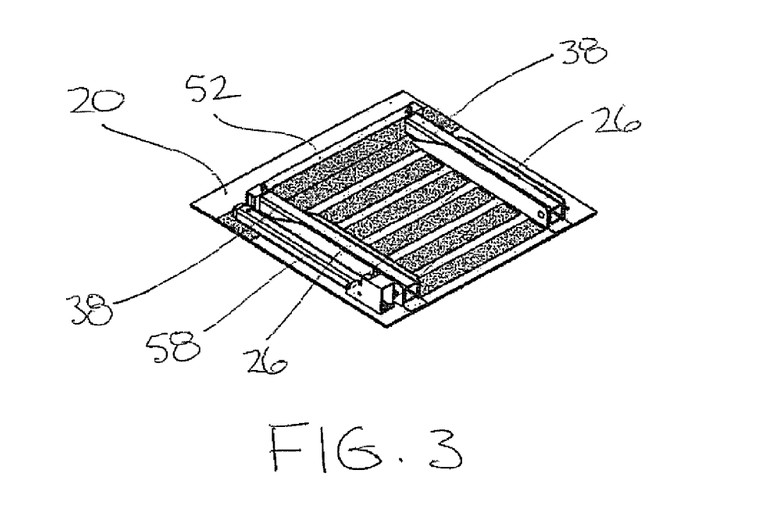
FIG. 3 is a perspective view similar to FIG. 2 with the step device shown in a stored position.
Figure 4:
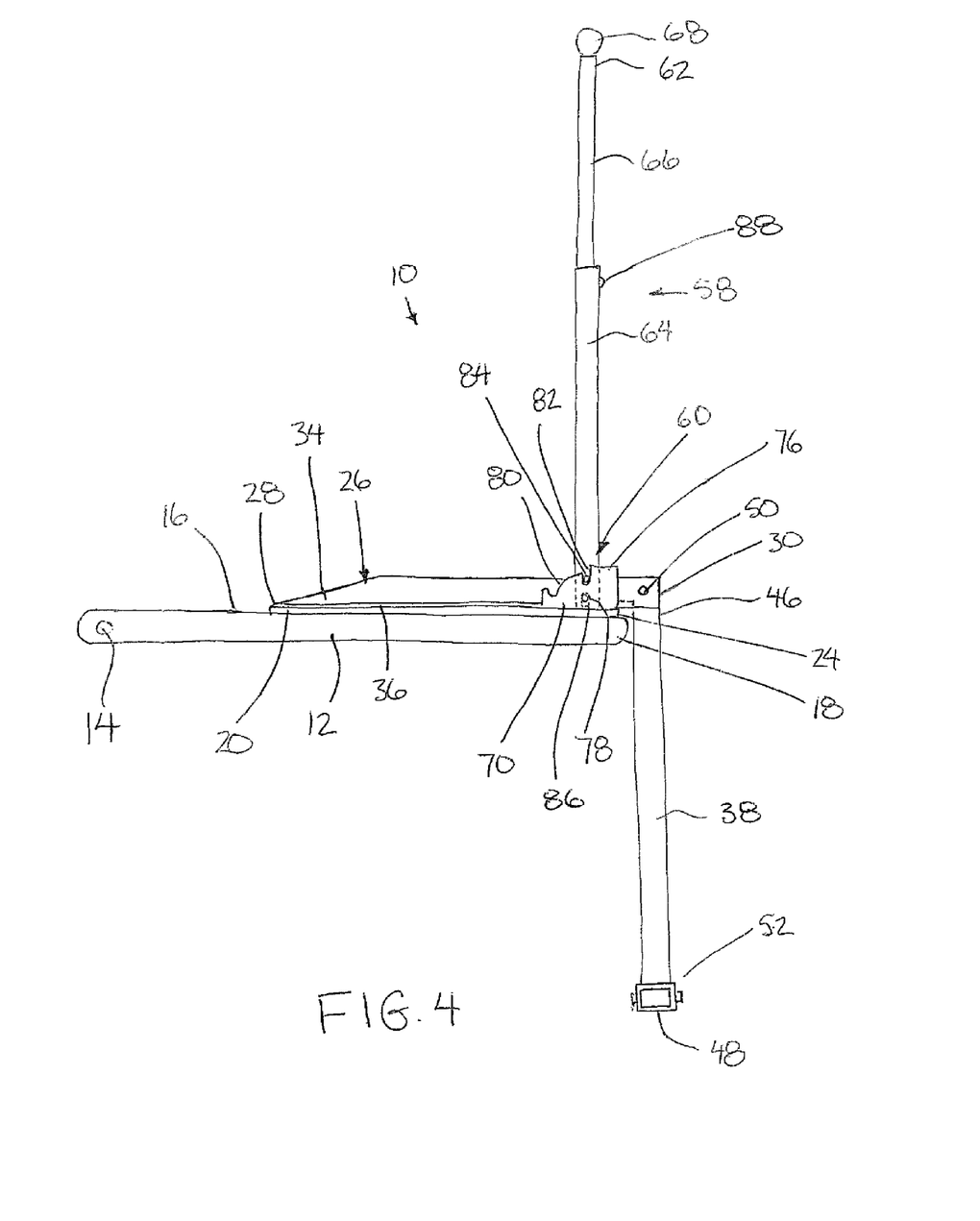
FIG. 4 is a side elevational view of the step device in the working position.
Figure 5:
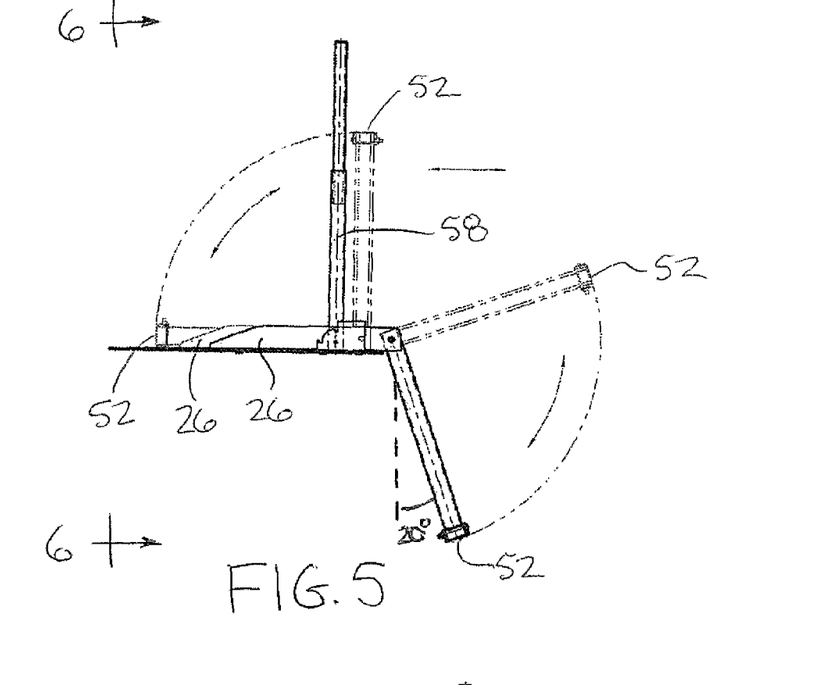
FIG. 5 is a side elevational view of the step device in the working position with the step device shown in the stored position and in two intermediate positions between the working and stored positions in broken line.
Figure 6:
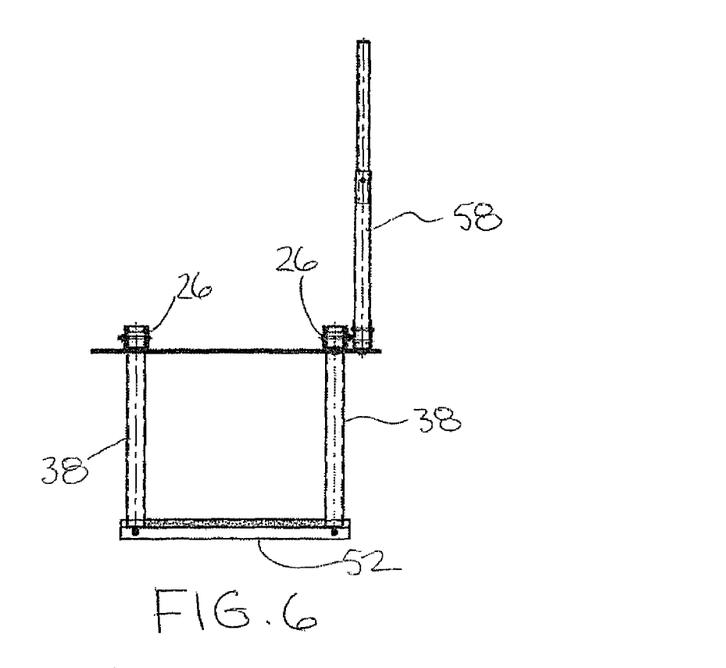
FIG. 6 is a front elevational view along the line 6-6 of the step device in the working position.
Figure 7:
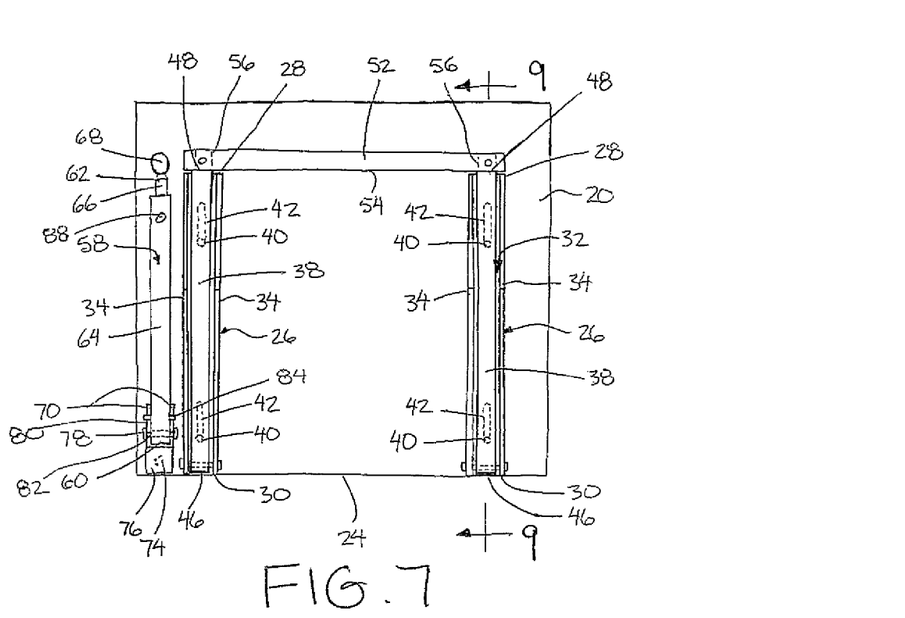
FIG. 7 is a top plan view of the step device in the stored position.
Figure 8:
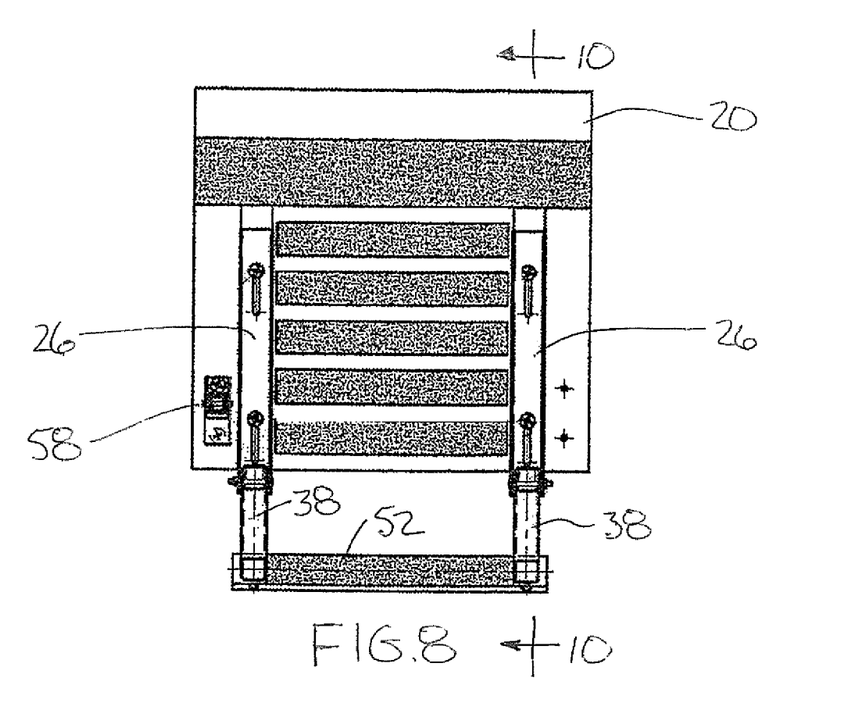
FIG. 8 is a top plan view of the step device in the working position.
Figure 9:
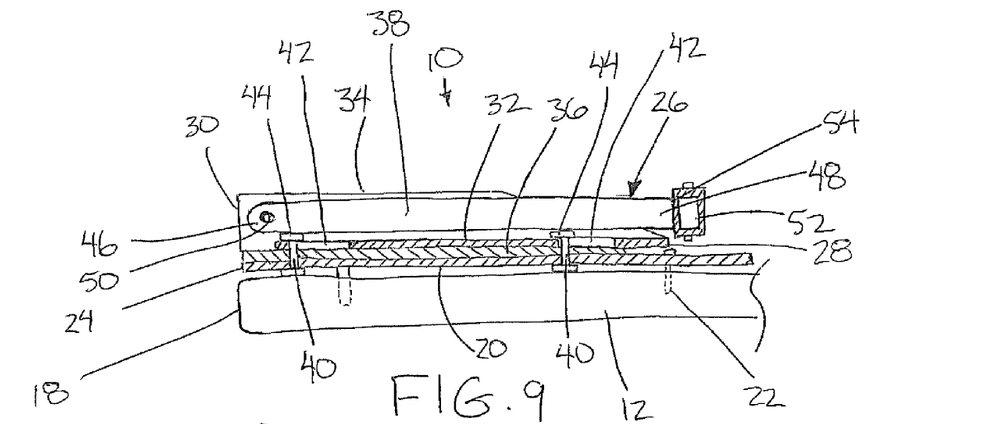
FIG. 9 is a sectional view along the line 9-9 in FIG. 7.
Figure 10:
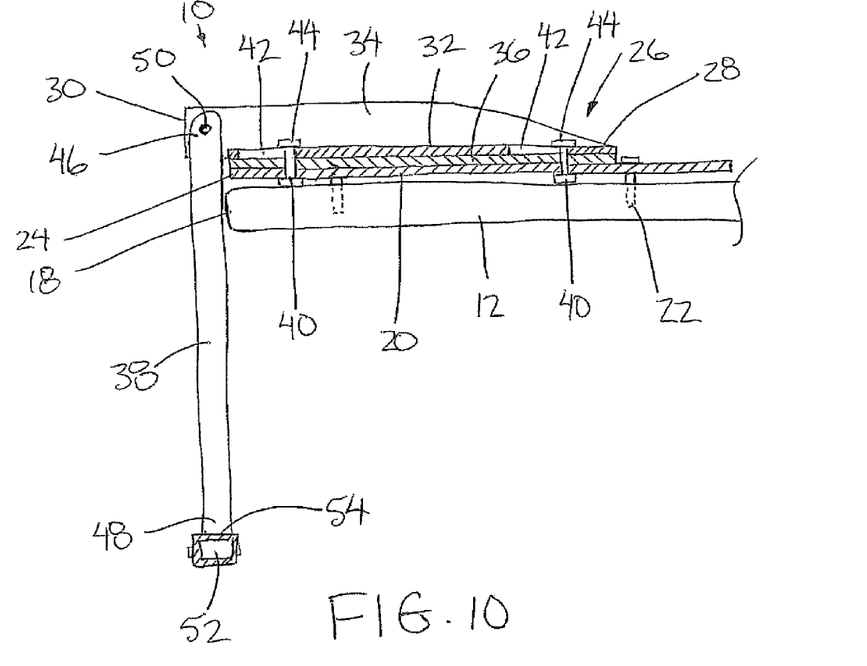
FIG. 10 is a sectional view along the line 10-10 of FIG. 8.

More particularly, each rail is supported for sliding movement between a retracted position as shown in FIG. 3 in which the outer end of the rails are substantially flush with the outer end of the slider and the base so that the rail does not protrude outwardly beyond the outer end of the tailgate, and an extended position shown in FIG. 2 in which the outer end of the rails do protrude in the longitudinal direction outward beyond the end of the gate. In the extended position, the inner end of the rail is spaced inwardly from the inner end of the base so as to be substantially flush with the inner end of the slider at a location nearer to the outer end of the gate and base than in the retracted position.

The base flange 32 of each rail is shorter in the longitudinal direction than the side walls at the outer end such that the base flange 36 terminates at an outer end which is substantially flush with the outer end of the base and the tailgate in the extended position while only the side flanges continue to project in the longitudinal direction outward beyond the end of the tailgate. The outward protruding portions of the two side flanges of each rail serve to pivotally couple a respective leg 38 therebetween as described further below.

Each rail is coupled to the base by a pair of longitudinally spaced apart fasteners 40. Each fastener comprises a vertical post extending through a respective aperture in the slider and through a respective slot 42 in the base flange of the rail while being fixed at a bottom end to the base member. A head 44 of the fastener is threaded onto the top end for overlapping a top surface of the base flange along opposing edges of the respective slot receiving the fastener therethrough. Each slot 42 is elongate in the longitudinal direction such that the post of the respective fastener 40 received therethrough is slidable relative to the slot in the longitudinal direction between the retracted position of the rails in which one end of each slot abuts the fastener and the extended positions of the rails in which the opposing ends of the slots abut the respective fasteners.

Each leg 38 is elongate in a longitudinal direction between a first end 46 and an opposing second end 48. The first end is pivotally coupled between the side flanges of a respective rail at a location spaced longitudinally outward beyond the end of the base flange such that the leg is arranged to be suspended vertically downward from the pivotal connection to the rail without interference with the base flange. Each leg is pivotally coupled by a lateral pivot shaft 50 in line with the opposing pivot shaft such that the two legs are pivotal about a common lateral axis extending in the second direction of the tailgate.

The two legs 38 are joined by a step member 52 connected between the second ends 48 of the two legs such that the two legs are always pivotal together through a range of approximately 270 degrees between a stored position and a working position. In the stored position, each leg extends parallel and alongside the respective rail between the side flanges thereof such that the first end 46 is located at the outer end of the rail and the second end 48 is adjacent to the inner end of the rail. In the working position each leg extends downwardly from the first end 46 coupled to the outer end of the rail to the opposing second end which is suspended at a location spaced below the base and the tailgate in the open position. Due to the interference with the base plate when the rails are in the retracted position, the legs can only be pivoted into the working position in the extended position of the rails.

Each of the legs comprises a rigid metal tube of square cross section arranged to be coupled to the step member which also comprises a rigid metal tube of substantially rectangular cross section. The step member includes an upper surface 54 which is arranged to be oriented substantially horizontally in the working position to define a stepping surface upon which a user can step. Sockets 56 are provided at opposing ends of the step member in the upper surface into which the second ends of the respective legs are slidably received for being retained therein by fasteners extending transversely through the ends of the legs and the step member.

The legs are otherwise unattached so as to be fully opened and unobstructed therebetween along the full length of the legs, at the hinged locations at the first end thereof, and between the rails above the upper surface of the plate forming the base. The rails are only joined directly by the base plate therebelow such that the area between the two rails is fully open and unobstructed providing open and unobstructed access to the upper surface of the base plate between the rails along the full length of the rails between the inner and outer ends thereof, as well as between the inner and outer ends of the base plate.

The device 10 further comprises a handle 58 which is elongate in a longitudinal direction between a first end 60 pivotally coupled to the base and an opposing second end 62 forming a free end arranged to be gripped in the hand of a user stepping on the step member 52. The handle comprises a lower section 64 at the first end which is pivotally coupled to the base and an upper section 66 above the lower section in which the upper and lower sections each comprise rigid tubular members of square cross section such that the upper section is slidably and telescopically received within the lower section for adjusting the length of the handle.

The lower section has a length corresponding approximately to the length of the rails so as to be near in length to the base between the inner and outer ends thereof with the upper section being similar in length. The handle can thus be extended between a retracted position having an overall length which is less than the length of the base in the first direction between the inner and outer ends thereof and an extended position having a length which is near to double the length of the base plate between the inner and outer ends. A gripping member 68 is mounted at the second end 62 of the upper section 66 having a suitable shape for readily gripping in the hand of the user.

The handle 58 is pivotal about a lateral axis extending in the second direction of the tailgate at a location adjacent the outer end of the base, adjacent and laterally outward from one of the rails on the base. The handle is pivotal between a working position oriented perpendicularly to the base and the inner surface of the tailgate and a stored position oriented parallel to the base such that the first end is positioned adjacent the outer end of the rails and base and the second end is positioned adjacent the inner end of the rails and base.

The first end of the handle is coupled to the base by a pair of hinge plates 70 which are parallel and laterally spaced apart so as to be oriented in the first direction while projecting upwardly from the base plate perpendicularly thereto. The two hinge plates are joined by a bottom plate 72 which is coupled to the base by suitable fasteners 74 to support the hinge plates in fixed relation to the base. A top plate 76 also joins the two hinge plates at the top ends spaced from the base for added structural support. The top plate is only located adjacent the outer end of the base such that the two hinge plates are unobstructed therebetween at the top end adjacent the inner end of the plates. The handle is accordingly pivotally coupled between the two hinge plates towards the inner end of the hinge plates such that the handle can be pivoted into the working position extending upwardly from the base in abutment with an inner edge of the top plate 76. The pivot shaft 78 coupled through the first end of the handle between the two hinge plates is fixed relative to the two hinge plates and defines a lateral axis about which the handle is pivoted.

The inner and top edge of each plate is generally convex in profile forming a radius of curvature about the pivot shaft 78 to extend generally upwardly and inwardly from the inner end to a top end which defines a raised edge 80 in relation to a depending slot 82 formed in the edge of the plate adjacent the top plate. The edges 80 of the plates cooperate with protrusions 84 on opposing sides of the handle respectively at a location spaced radially from the pivot shaft 78 in close proximity to the hinge plates such that the protrusions ride along the respective edges of the two plates as the handle is pivoted from the stored position to the working position.

The depending slots 82 are substantially vertically oriented so as to depend from the raised edge 80, while being arranged to be aligned with the protrusions in the working position of the handle such that the protrusions are arranged to be received within the slots in the working position. The apertures in the handle receiving the pivot shaft 78 therethrough are arranged to define elongate slots 86 in the longitudinal direction of the handle such that the handle is vertically slidable in the radial direction relative to the pivot shaft which corresponds to sliding movement in the longitudinal direction of the handle.

In the working position of the handle, the handle is thus vertically slidable relative to the base and the hinge plates such that the protrusions 84 are slidable together with the handle to define respective locking elements aligned with the slots 82 which are moveable from a locked position to a released position. In the locked position the handle is at its lowermost position in relation to the slots 86 receiving the pivot shafts 78 therein with the protrusions 84 being recessed downwardly into the depending slots 82 so that pivotal movement of the handle from the working position to the stored position is effectively prevented. By vertically sliding the handle upwardly, the protrusions 84 defining the locking elements are slidable therewith vertically upward in the slots 82 while the pivot shafts are slidable within the slots 86 to the released position.

In the released position, the protrusions 84 align with the raised edges 80 of the plates so that the handle is free to pivot back to the stored position. The raised edges 80 act as a cam surface such that simply pivoting the handle from the stored position to the working position causes the protrusions to ride up the raised edges 80 for automatically lifting the handle upwardly over the raised edges until the protrusions align with the slots 82 at which point the handle automatically falls down into the locked position.

In use the handle and the step member are typically initially located in the stored position with the rails retracted so that when the gate is closed, gravity maintains the components in the stored and retracted positions. When access to the truck box is desired, the tailgate is opened and the rails are slid outwardly from the retracted position to the extended position. The legs and step member are then free to be pivoted together upwardly and rearwardly, over centre, and then downwardly and rearwardly to the working position. In the working position, the legs abut the rear edges of the base flanges 32 of the respective rails 26 such that the base flanges act as stop members which limit further downward pivoting beyond the working position. In the working position the legs extend downward and rearward (outward) at an inclination of approximately 20 degrees from vertical so that the step member 52 is spaced rearwardly outwardly from the rear edge of the open tailgate.

The handle can also be pivoted upwardly into the working position such that the protrusions 84 defining the locking elements automatically raise the handle up and over the raised edge prior to dropping into the slots in the locked and working position of the handle. The inner section of the handle can then be extended relative to the outer section into the raised position thereof. The reverse operations allow the device to return to the stored position.

A sprung pin 88 is provide for cooperation with a respective aperture with which the pin on the inner section aligns to selectively lock the inner section relative to the outer section in the raised and working position. The sprung pin 88 may cooperate with a second aperture in alignment therewith in the retracted position to retain the inner section retracted in the stored position.

As described herein, the step is universal and easy to mount in any pickup truck box or onto flat deck beds by simply fastening the base to the corresponding inner surface. All of the components are mounted on a common base plate so as to be ready assembled and sized to fit most truck tailgates as well as fit under box covers with the tailgate closed. By securing the base plate correctly to the tailgate, box covers are above the swing arms yet in the open position the slide arms can extend past the tailgate and the swing arms or legs do not touch or damage the tailgate. The hand rail can be quickly swung and locked into position to ensure a safe step up into the truck box or onto a flat deck. The rails are connected to the base plate using barrel bolts while the slider comprises vinyl strips to provide easy in and out sliding of the rails. The pivoting legs are also coupled to the rails with vinyl spacer washers to ensure easily relative rotation therebetween. A high friction material such as non-slip tape is secured to the upper surface of the step member as well as the upper surface of the base plate between the rails to ensure a sure footing. The components of the handle, the rails, the legs, the step member and the base are all formed of non-rusting aluminium so as to be ruggedly built while having a minimal weight, typically less than 20 pounds. The construction also allows mounting to the tailgate typically in a minimal amount of time in the order of minutes.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A step device for a supporting surface of a vehicle arranged to span generally horizontally in a first direction from an inner end of the supporting surface to an opposing outer end of the supporting surface, the step device comprising:

a base arranged for attachment to the supporting surface;

a pair of rails mounted on the base parallel and spaced apart from one another so as to be arranged to extend longitudinally in the first direction between an inner end of the rails and an outer end of the rails, each rail being longitudinally slidable relative to the base between an extended position in which the outer end is arranged to project outwardly in the first direction beyond the outer end of the supporting surface and a retracted position in which the outer end does not project outwardly beyond the outer end of the supporting surface;

a leg pivotally coupled at a first end to the outer end of each rail such that the leg is pivotal relative to the respective rail through a range of more than 225 degrees between a working position arranged to extend downwardly from the first end of the leg at the outer end of the respective rail in the extended position of the respective rail to an opposing second end of the leg and a stored position arranged to extend alongside the respective rail from the first end of the leg at the outer end of the respective rail to the second end of the leg adjacent the inner end of the respective rail; and a step joined between the legs at a location spaced from the first ends of the legs such that the legs are pivotal together between the working position and the stored position thereof and such that the rails are slidable together in the stored position of the legs between the extended position and the retracted position of the rails;

wherein the base consists of a flat plate member upon which the rails are supported; and wherein the rails are connected only by the flat plate member of the base such that the base is substantially unobstructed between the rails above the flat plate member of the base.

2. The device according to claim 1 wherein there is provided a slider comprising material having a low coefficient of friction mounted between each rail and the base for sliding movement relative to one of the base or the respective rail.

3. The device according to claim 2 wherein the base and the rails are formed of metal and the slider comprises plastic material.

4. The device according to claim 1 wherein each of the rails spans substantially a full length of the respective leg between the first end of the respective leg and the second end of the respective leg.

5. The device according to claim 1 wherein each rail comprises a generally U-shaped channel comprising a pair of parallel and spaced apart side flanges extending upwardly from a base flange joined therebetween and receiving the respective leg therebetween in the stored position.

6. The device according to claim 1 wherein each rail includes at least one longitudinally extending slot arranged to receive a respective lug protruding from the base therein such that the lug is slidable along the slot as the rail is displaced between the retracted and extended positions respectively.

7. The device according to claim 6 wherein there is provided a pair of lugs protruding from the base at longitudinally spaced apart locations in association with each rail, each lug being slidably received within a respective longitudinally extending slot.

8. The device according to claim 6 wherein each lug comprises a threaded fastener.

9. The device according to claim 6 wherein the rails are only coupled to the base by the lugs in the respective longitudinally extending slots.

10. The device according to claim 1 wherein there is provided an elongate handle extending between a first end pivotally coupled to the base and an opposing second end such that the handle is pivotal between a stored position along the base alongside one of the rails and a working position extending perpendicularly upward from the base, the handle including a lower section which is near in length to one of the rails and an upper section which is telescopically received in the lower section.

11. The device according to claim 1 wherein there is provided an elongate handle extending between a first end pivotally coupled between a pair of hinge plates on the base and an opposing second end such that the handle is pivotal between a stored position along the base alongside one of the rails and a working position extending perpendicularly upward from the base, the handle includes a locking element which is vertically slidable upwardly in the working position from a locked position in which the handle is prevented from being pivoted into the stored position to a released position in which the handle is pivotal from the working position to the stored position.

12. The device according to claim 11 wherein the locking element comprises a protrusion on the handle slidably received in a vertical slot on one of the hinge plates in the locked position.

13. The device according to claim 12 wherein at least one of the hinge plates comprises a raised edge upon which the protrusion on the handle is slidably engaged as the handle is pivoted from the working position, the vertical slot depending downwardly from said raised edge in alignment with the protrusion on the handle when the handle is in the working position.

14. The device according to claim 12 wherein the handle is vertically slidable together with the locking element between the locked position and the released position.

15. The device according to claim 1 wherein there is provided a gripping material on an upper surface of the base between the rails.

16. The device according to claim 1 in combination with the supporting surface in which the supporting surface comprises an inner surface of a tailgate of a vehicle and the inner end of the supporting surface is hinged to the vehicle such that the tailgate is pivotal between a closed position in which the inner surface of the tailgate is substantially upright and an open position in which the inner surface spans substantially horizontally outwardly in the first direction from the inner end of the supporting surface hinged on the vehicle to the outer end of the supporting surface forming a free end opposite the inner end of the supporting surface.

17. A step device for a supporting surface of a vehicle arranged to span generally horizontally in a first direction from an inner end to an opposing outer end, the step device comprising:

a base arranged for attachment to the supporting surface;

a pair of rails mounted on the base parallel and spaced apart from one another so as to be arranged to extend longitudinally in the first direction between an inner end and an outer end of the rails, each rail being longitudinally slidable relative to the base between an extended position in which the outer end is arranged to project outwardly in the first direction beyond the outer end of the supporting surface and a retracted position in which the outer end does not project outwardly beyond the outer end of the supporting surface;

a leg pivotally coupled at a first end to the outer end of each rail such that the leg is pivotal relative to the respective rail through a range of more than 225 degrees between a working position arranged to extend downwardly from the first end of the leg at the outer end of the respective rail in the extended position of the respective rail to an opposing second end of the leg and a stored position arranged to extend alongside the respective rail from the first end of the leg at the outer end of the respective rail to the second end of the leg adjacent the inner end of the respective rail; and a step joined between the legs at a location spaced from the first ends of the legs such that the legs are pivotal together between the working position and the stored position thereof and such that the rails are slidable together in the stored position of the legs between the extended position and the retracted position of the rails;

wherein the base is substantially unobstructed between the rails; and wherein each rail comprises a generally U-shaped channel comprising a pair of parallel and spaced apart side flanges extending upwardly from a base flange joined therebetween and receiving the respective leg therebetween in the stored position.

18. The device according to claim 17 wherein the base flange is coupled to the base for relative sliding movement therebetween.

\* \* \* \* \*